No. 696,509. Patented Apr. 1, 1902.
J. STICKEL.
JOURNAL BEARING.
(Application filed Apr. 25, 1901.)
(No Model.) 2 Sheets—Sheet 1.
Fig. I.
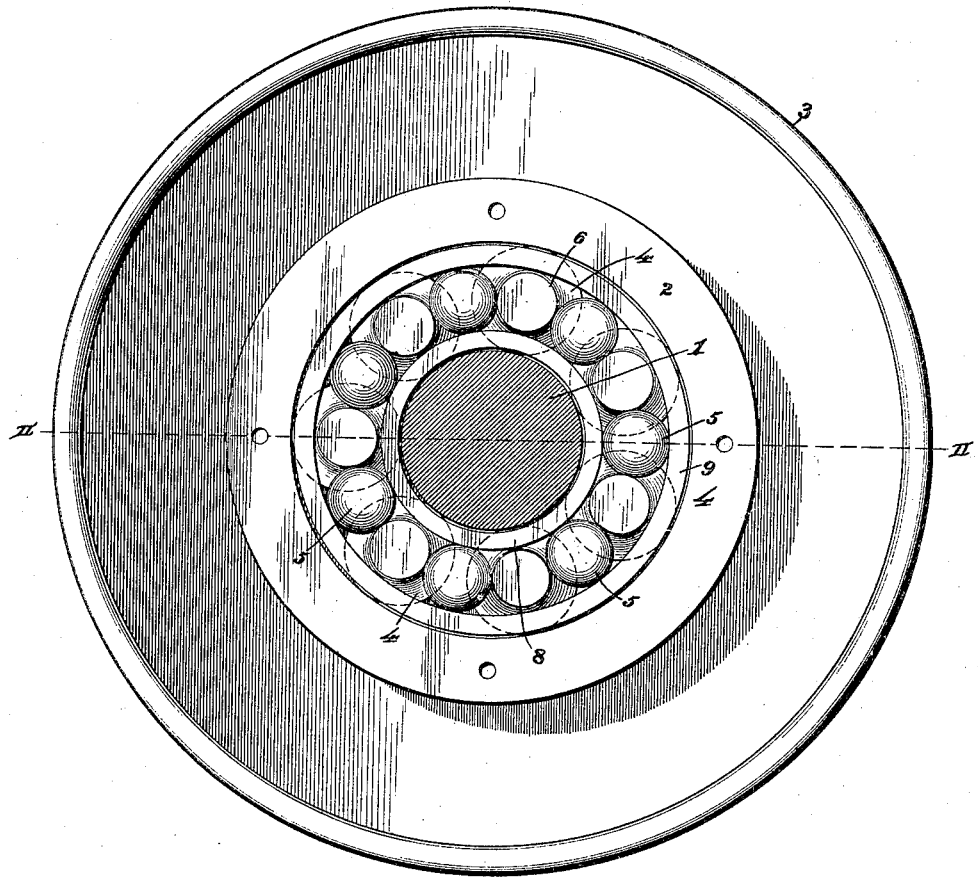
WITNESSES:
INVENTOR:
Jacob Stickel,
BY
Attorney.

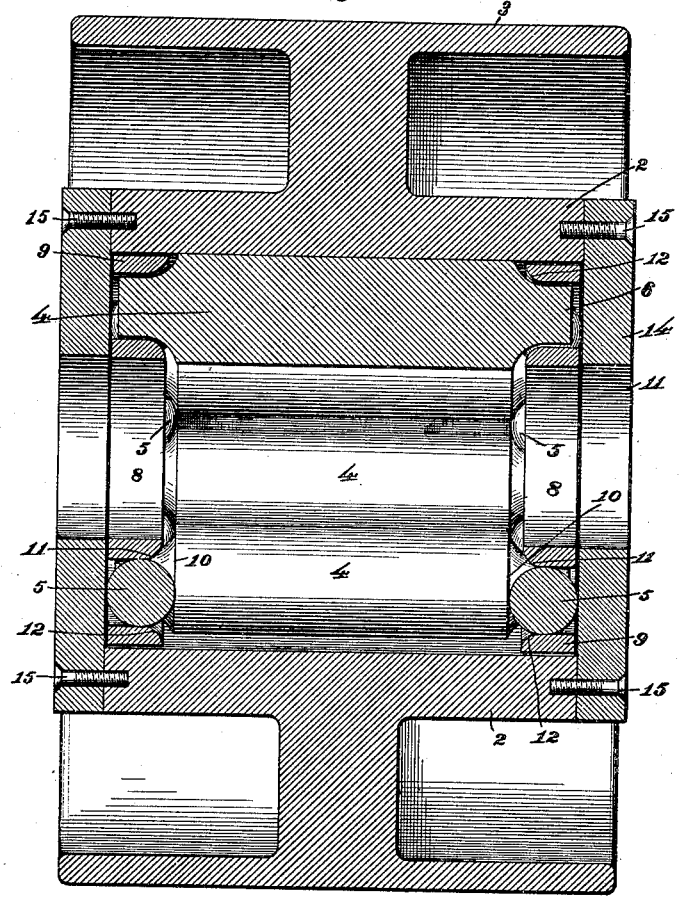

UNITED STATES PATENT OFFICE.

JACOB STICKEL, OF WILLIAMSPORT, PENNSYLVANIA, ASSIGNOR OF FIVE-SIXTHS TO HENRY C. McCORMICK AND C. F. OVERHISER, OF WILLIAMSPORT, PENNSYLVANIA, AND JOSEPH L. ATKINS, OF WASHINGTON, DISTRICT OF COLUMBIA.

JOURNAL-BEARING.

SPECIFICATION forming part of Letters Patent No. 696,509, dated April 1, 1902.

Application filed April 25, 1901. Serial No. 57,486. (No model.)

*To all whom it may concern:*

Be it known that I, JACOB STICKEL, of Williamsport, in the county of Lycoming, State of Pennsylvania, have invented certain new and useful Improvements in Journal-Bearings, of which the following is a complete specification, reference being had to the accompanying drawings.

The object of my invention is to produce improvements in that class of journal-bearings in which friction is reduced to a minimum through the employment of rolling members between a journal or axle and its box, wherein provision is made for the practical elimination of friction between all the bearing parts of the device under varying conditions in use and whereby all injurious heating by friction is obviated without the use of oil or other lubricant.

My invention is applicable to bearings generally, whether the box be stationary and the journal rotative, the axle be fixed and the box rotative, or both be rotative.

In the accompanying drawings I illustrate my invention, for the purposes of explanation, as incorporated in a loose pulley rotative upon a shaft, and Figure I thereof is a side elevation of the pulley with the cap-plate of its box removed and the shaft illustrated in section. Fig. II is a section on the line II II of Fig. I with both cap-plates of the box in position and the shaft omitted. The line of section upon which Fig. II is taken is, as shown in Fig. I, taken through one of the bearing members on one side of the axle, and through a pair of the spacing members on the opposite side.

Referring to the numerals on the drawings, 1 indicates a shaft, and 2 a cylindrical box or bushing, of a pulley 3, which are presented as examples of relatively rotative members between which my device may be employed.

Between the shaft 1 and the box 2 and in contact with the outer and inner walls thereof, respectively, I provide a plurality of rolling bearing members 4. The number and size of the bearing members employed may be varied at will, the number illustrated being shown merely by way of example. The several bearing members are kept separated from one another by a series of rolling spacing members 5, which are preferably spherical in shape and whose peripheries osculate against the peripheries of reduced ends 6 upon each of the bearing members. The bearing members and spacing members are arranged in alternate succession about the shaft 1 within the box 2, so that the center of each spacing member and the axis of each bearing member are concentric with the shaft. Two series of spacing members are provided—one for each end of the series of bearing members—and I therefore designate the spacing members as terminally located with respect to the bearing members.

In order to keep the centers of the spacing members and the axes of the bearing members concentric with the shaft 2 and at the same time provide for the independent rolling action of the several members without grinding friction between them or any of the parts with which they come in contact, I employ for each series of spacing members two loose rings 8 and 9. The ring 8 surrounds the shaft 1, but being of greater internal diameter than the external diameter of the shaft preferably touches it at no point. The ring 9 fits loosely within the box 2, but having an external diameter less than internal diameter of the box preferably makes contact therewith at no point. Through the employment of the rings 8 and 9 each series of spacing members is held in required operative relation to the bearing members, as specified, and each ring is free to travel in the direction of the single impulse imparted to it with a minimum of friction, it being observed that the reduced ends 6 of the bearing members 4 are of smaller diameter than the spacing members 5 and that no contact is made between the rings 8 and 9 and the bearing members.

By way of summary it may be stated that bearing contact is made exclusively between the bearing members and the shaft 1 and box 2, respectively, that spacing contact is made only between the spacing members and the reduced ends of the bearing members, and that the rings 8 and 9 making contact solely with the spacing members constitute alining members for the spacing members.

In order to provide against friction which might result from end thrust upon the bearing members, each of those members 4 is provided between each of its reduced ends and its body part with a shoulder 10, with which the spacing members of each series severally make contact. The corners of the rings 8 and 9 that are adjacent to the shoulders 10 of the bearing members are shaped, as indicated at 11 and 12, respectively, to permit the rings to approach closely to the shoulder without making contact therewith.

The ends of the box 2 are closed by cap-plates 14, annular in shape, if the shaft 1 extends entirely through the box, and which are secured firmly in place, as by screws 15 passing through apertures provided for them in the plates, respectively, and screwing into the box 2.

The bearing members 4 are shorter in length than the longitudinal extent of the box 2 and are held out of contact with the plates 14 by the interposition of the spacing members 5, which fill the space between the respective shoulders 10 and the plates 14, with which, respectively, they make rolling contact. The rings 8 and 9 are of a width to fit loosely between the shoulders 10 and plates 14, so that they may travel freely without friction therewith.

In operation if relative rotary movement be imparted to the pulley 3 and the shaft 1 the bearing members 4 are caused to rotate all in one direction and move freely with a minimum development of friction through the regulation of the loosely-supported spacing and alining members specified, endwise movement of the bearing members being prevented through contact between the shoulders 10 thereof and the cap-plates 14 of the box of the spacing members 5.

What I claim is—

1. In a journal-bearing, the combination with a box provided with cap-plates and a plurality of rolling bearing members contained within the box between the cap-plates thereof, of two series of rolling spacing members at opposite ends, respectively, of the bearing members, and a pair of loose alining members for each series of spacing members carried by the spacing members within the box.

2. In a journal-bearing, the combination with a box provided with cap-plates and a plurality of rolling bearing members contained within the box between the cap-plates thereof, there being reduced ends upon each of the bearing members, of a series of rolling spacing members for each end of the bearing members, and a pair of alining members for each series of spacing members carried by the spacing members loose within the box.

3. In a journal-bearing, the combination with a box provided with cap-plates and a plurality of rolling bearing members contained within the box between the cap-plates thereof, said bearing members being shorter than the box, there being reduced ends upon each of the bearing members, of a series of rolling spacing members for each end of the bearing members making contact with the bearing members and with the cap-plates of the box, and a pair of loose alining members for each series of spacing members carried by the spacing members within the box.

4. In a journal-bearing, the combination with a box provided with cap-plates and a plurality of rolling bearing members contained within the box between the cap-plates, said bearing members being shorter than the box, there being reduced ends defined, respectively, by shoulders upon each of the bearing members, of a series of rolling spacing members for each end of the bearing members, said spacing members making contact with the reduced ends and shoulders of the bearing members, and a pair of loose alining members for each series of spacing members carried by the spacing members within the box.

In testimony of all which I have hereunto subscribed my name.

JACOB STICKEL.

Witnesses:
 KIMBALL S. MILLER,
 WALTER E. JAHN.